(12) United States Patent
Michael et al.

(10) Patent No.: US 8,038,788 B2
(45) Date of Patent: Oct. 18, 2011

(54) COATING SYSTEMS

(75) Inventors: Guenther Michael, Karlstein (DE); Juergen Meyer, Stockstadt (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 12/741,393

(22) PCT Filed: Nov. 20, 2008

(86) PCT No.: PCT/EP2008/065912
§ 371 (c)(1), (2), (4) Date: May 5, 2010

(87) PCT Pub. No.: WO2009/074438
PCT Pub. Date: Jun. 18, 2009

(65) Prior Publication Data
US 2010/0236451 A1    Sep. 23, 2010

(30) Foreign Application Priority Data

Dec. 11, 2007  (EP) .................... 07122862

(51) Int. Cl.
*C09C 1/30* (2006.01)
*C09C 1/28* (2006.01)
*C04B 14/04* (2006.01)
*C09D 201/00* (2006.01)

(52) U.S. Cl. ................ 106/287.34; 106/482; 423/335; 423/339

(58) Field of Classification Search ............. 106/287.34, 106/482; 423/335, 339
See application file for complete search history.

(56) References Cited

U.S. PATENT DOCUMENTS

| | | |
|---|---|---|
| 5,959,005 A | 9/1999 | Hartmann et al. |
| 6,593,393 B2 * | 7/2003 | Frahn et al. ............ 522/83 |
| 2005/0241531 A1 | 11/2005 | Meyer et al. |
| 2005/0244642 A1 | 11/2005 | Meyer et al. |
| 2007/0191537 A1 | 8/2007 | Meyer et al. |

FOREIGN PATENT DOCUMENTS

| | | |
|---|---|---|
| EP | 1 736 505 | 12/2006 |
| WO | 2004 020531 | 3/2004 |
| WO | 2004 020532 | 3/2004 |
| WO | 2005 095525 | 10/2005 |

* cited by examiner

*Primary Examiner* — Anthony Green
(74) *Attorney, Agent, or Firm* — Oblon, Spivak, McClelland, Maier & Neustadt, L.L.P.

(57) ABSTRACT

Coating systems characterized in that they contain 0.5% by weight to 30% by weight of a hydrophilic, structurally modified, optionally reground, fumed silica.

10 Claims, 3 Drawing Sheets

The effect of structural modification in pyrogenic oxides on the basis of TEM micrographs Not structurally modified Structurally modified 2K PU HS clearcoat (flow curve)

COATING SYSTEMS

The invention relates to coating systems.

The incorporation of fumed (pyrogenically prepared) silica (silicon dioxide) into coating materials is known.

From the document Schriftenreihe Pigmente No. 18 (April 1980) page 4, the incorporation of hydrophobic fumed silica (Aerosil® 972) together with pigments and fillers into coating materials is known. To produce a clearcoat material, for instance, the preparation is recommended of an approximately 10% paste in the respective binder solution, for which it is possible to use known dispersing equipment. The paste thus prepared is used as a grinding medium for the further steps in producing the coating material.

Also known is the incorporation into coating materials of silanized, structurally modified fumed silica, the binder being mixed with solvent, and the silica being mixed into this mixture by means of a high-speed mixer. The mixture is subsequently dispersed using a bead mill (WO 2004/020532).

Also known is the use of a dispersion of fumed silica characterized in that it comprises a structurally modified silanized silica and a solvent for the preparation of coating materials which are characterized in that the coating materials, in addition to a relatively high scratch resistance, exhibit less of an unwanted haze or an unwanted frosting (WO 2007/128636).

The known methods of incorporating fumed silica into the coating system have the disadvantage that the clearcoat materials produced in this way exhibit inadequate brightness of colour, measured on the basis of the black number My (also called Jetness, Technical Information No. 1204, Degussa AG).

The object was therefore to develop a process allowing the fumed silica, with easy dispersibility, to be incorporated into coating systems in such a way that the coating materials exhibit not only improved scratch resistance but also high brilliance of colour, measured on the basis of the black number My.

The invention provides coating systems characterized in that they contain 0.5% by weight to 30% by weight of a hydrophilic, structurally modified and optionally reground, fumed silica.

The structurally modified, hydrophilic, fumed silica used in accordance with the invention can have a tamped density of 100 to 250 g/l.

Starting from a fumed, hydrophilic silica having a BET surface area of $200\pm25$ m$^2$/g, the structurally modified silica used in accordance with the invention can have a DBP number of 160 to 240 g/100 g (DIN 53601).

Starting from a fumed, hydrophilic silica having a BET surface area of $300\pm30$ m$^2$/g the structurally modified silica used in accordance with the invention can have a DBP number of 180 to 250.

The water content not only of the silica starting material used but also of the structurally modified silicas used in accordance with the invention can be less than 1.5% by weight.

The reground, structurally modified silicas used in accordance with the invention can have a grindometer value of less than/equal to 60 μm, preferably less than/equal to 40 μm.

The structurally modified silica used in accordance with the invention can have a water content which is higher than that of the silica starting materials used. It can be not more than 3.5% by weight.

A process for preparing the hydrophilic fumed silica used in accordance with the invention can be characterized in that hydrophilic fumed silica is structurally modified and optionally reground.

The structural modification is carried out by means of a ball mill, or of a continuously operating ball mill. Prior to and/or during the structural modification, water can be added to the silica. This addition may be made in an amount of 0.5% to 5% by weight, preferably 0.5% to 2% by weight. It results in a lower thickening effect.

Following structural modification, the DBP number is lower or cannot be ascertained.

The structural modification raises the grindometer value (particle size limit). The increased grindometer value, however, is lowered again during regrinding.

In the course of structural modification, the agglomeration structure of the fumed silica is very largely destroyed. This can be seen from the figures.

BRIEF DESCRIPTION OF THE DRAWINGS

FIG. 1 shows the original fumed silica, while

Figure 1:
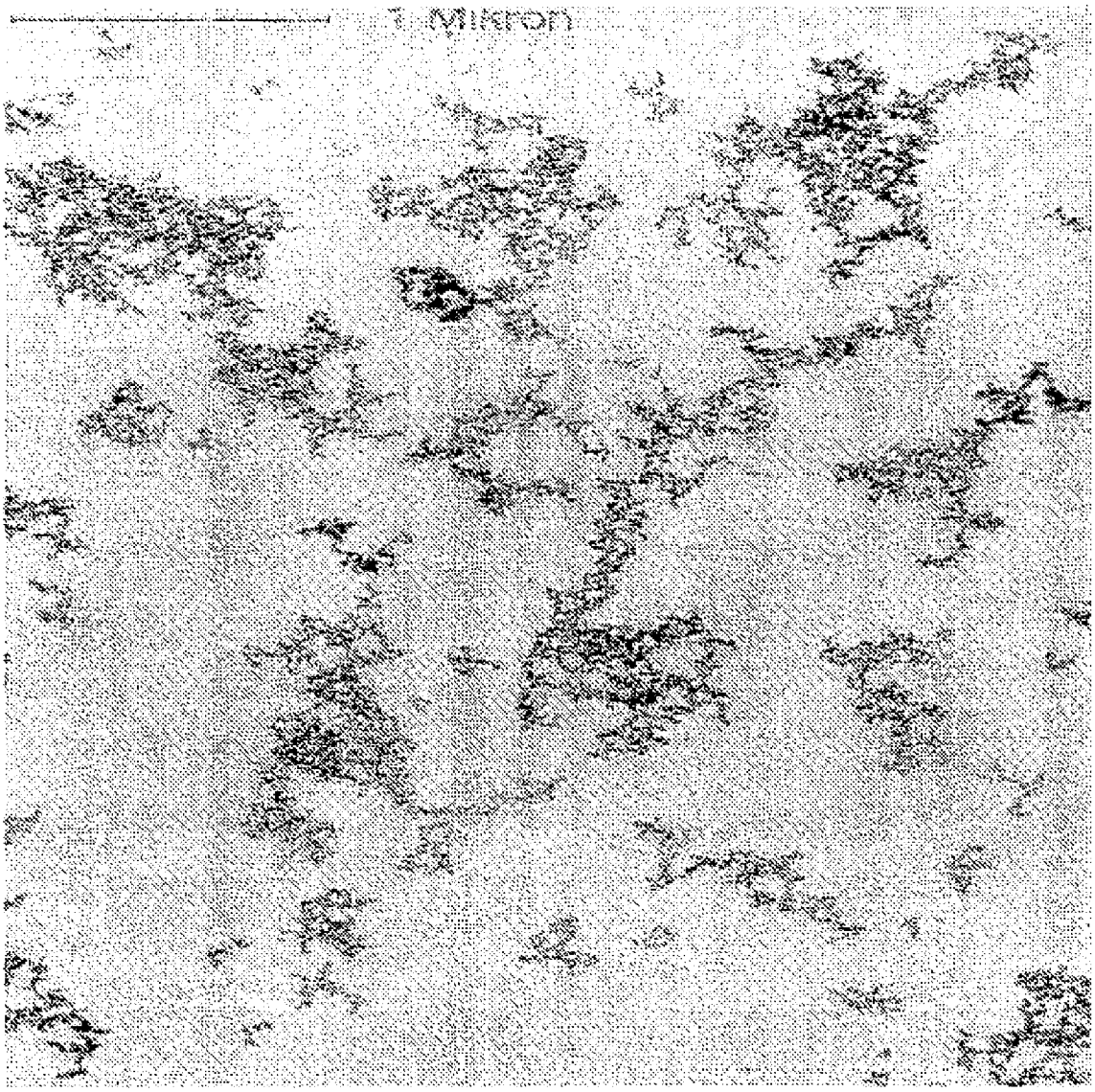
Figure 2:
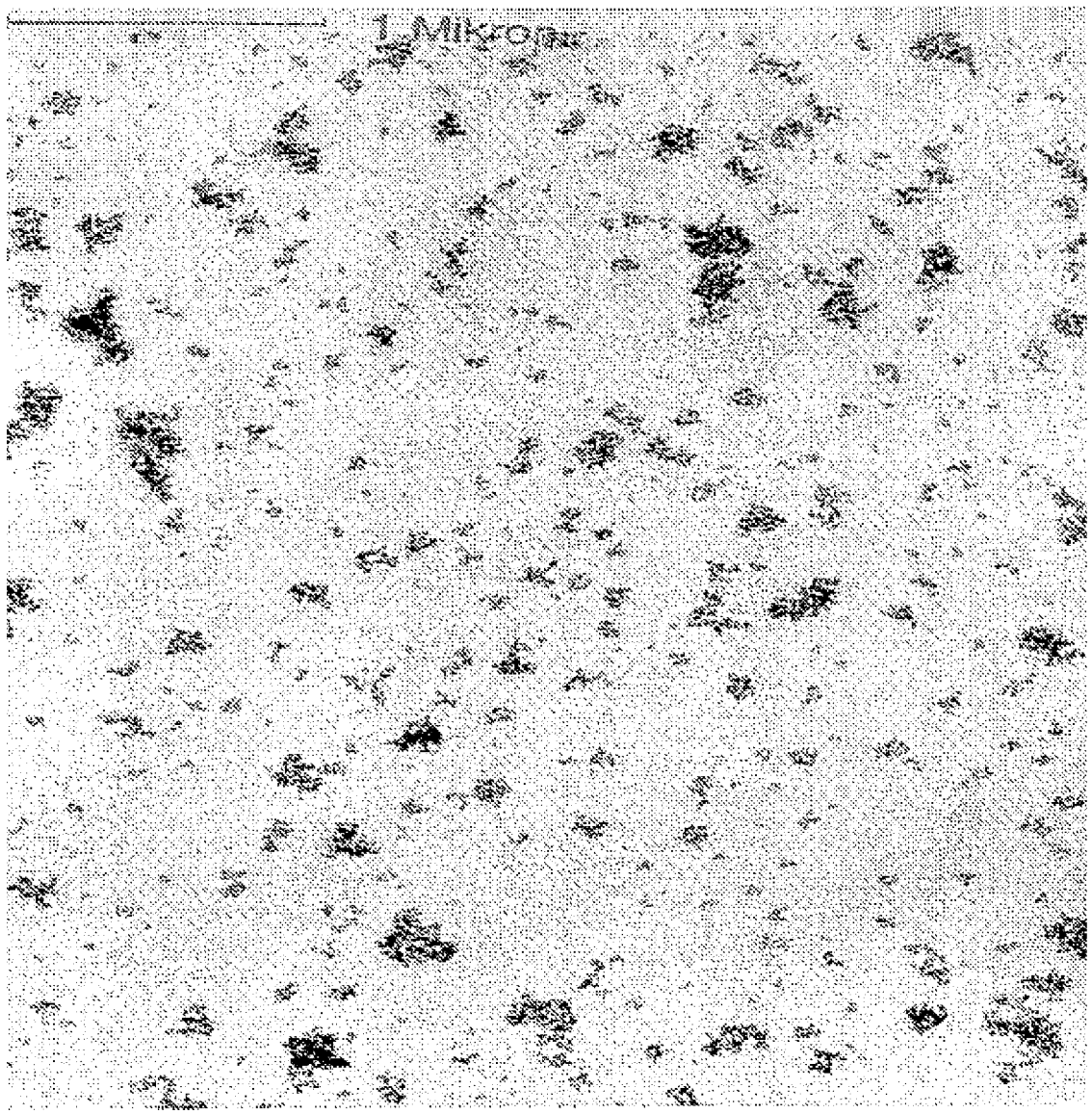
FIG. 2 represents the structurally modified fumed silica.
Figure 3:
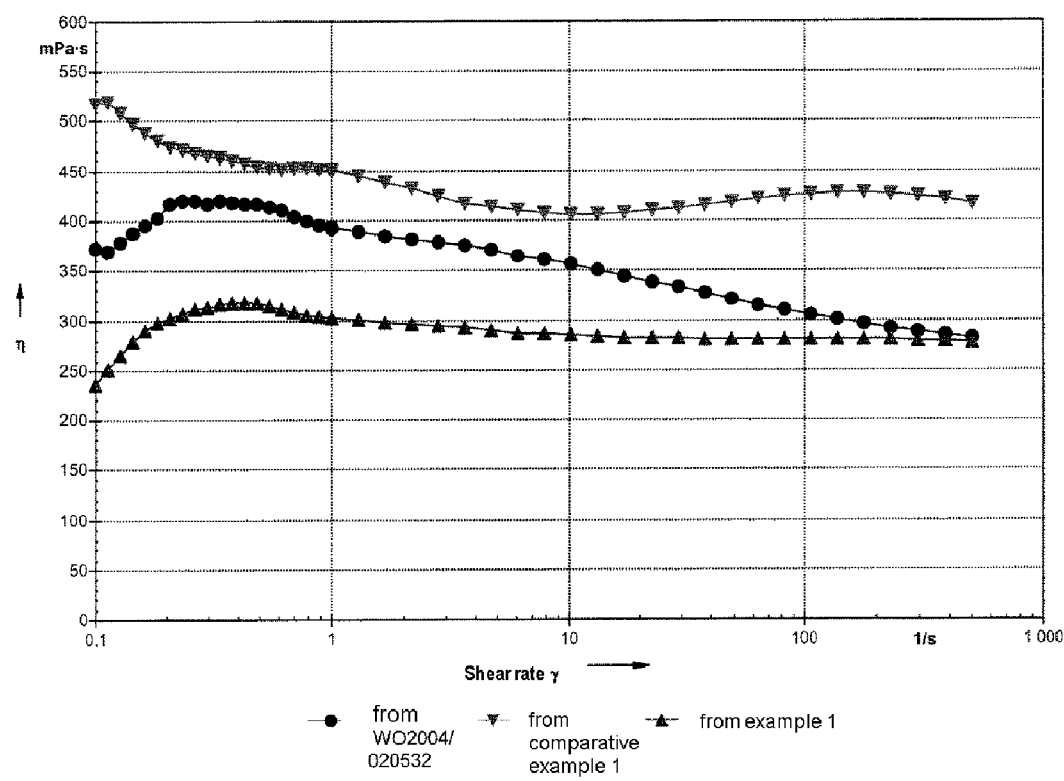
FIG. 3 shows the clearcoat flow curves for example 1, comparative example 1, and WO2004/020532.

The structurally modified fumed silica has a higher tamped density. The individual aggregates remaining are more spherical. They can have a thickening effect of <1400. In the case of an initial silica having a BET surface area of $200\pm25$ m$^2$/g, the thickening effect can be <1000. In the case of an initial silica having a BET surface area of $300\pm30$ m$^2$/g, the thickening effect may be <1400.

Regrinding reduces the grindometer value, with the particle size distribution being shifted towards smaller particles.

The structure of the fumed silica that has remained after structural modification is not adversely affected by regrinding.

Regrinding has virtually no effect on the performance properties of the structurally modified, fumed silica, since the energy input for regrinding is lower than in the ball mill.

For the regrinding it is possible, for example, to use the following apparatus: air-jet mill, toothed-disc mill or pinned-disc mill. More preferably an air-jet mill can be used.

Following structural modification and/or regrinding, a heat treatment may be carried out. This heat treatment may take place batchwise, in a drying cabinet for example, or continuously, in a fluid bed or fluidized bed, for example.

As hydrophilic fumed silicas it is possible to use hydrophilic fumed silicas which have a BET surface area of $50\pm30$ to $380\pm30$ m$^2$/g. With particular preference it is possible to use hydrophilic fumed silicas which have a BET surface area of $200\pm25$ or $300\pm30$ m$^2$/g.

More particularly it is possible to use the following hydrophilic fumed silicas listed in Table 1.

TABLE 1

| | | AEROSIL® 200 | AEROSIL® 300 |
|---|---|---|---|
| CAS Reg. number | | | |
| Attitude to water | | | |
| Appearance | | | |
| BET surface area[1] | m$^2$/g | 200 ± 25 | 300 ± 30 |
| Average primary particle size | mm | 12 | 7 |
| Tamped density[2] standard product | g/l | about 50 | about 50 |
| compacted product (coded "C") | g/l | about 120 | about 120 |
| Loss on drying[3] (2 h at 105° C.) on leaving supply plant | % | <1.5 | <1.5 |
| Loss on ignition[4][7] (2 h at 1000° C.) | % | <1 | <2 |
| pH[5] (in 4% aqueous dispersion) | | 3.7-4.7 | 3.7-4.7 |
| SiO$_2$[8] | % | >99.8 | >99.8 |
| Al$_2$O$_3$[8] | % | <0.05 | <0.05 |
| Fe$_2$O$_3$[8] | % | <0.003 | <0.003 |
| TiO$_2$[8] | % | <0.03 | <0.03 |

TABLE 1-continued

|  |  | AEROSIL® 200 | AEROSIL® 300 |
|---|---|---|---|
| HCl[8)10)] | % | <0.025 | <0.025 |
| Sieve residue[6)] (Mocker, 45 μm) | % | <0.05 | <0.05 |

[1)] based on DIN 66131
[2)] based on DIN ISO 787/XI, JIS K 5101/18 (unsieved)
[3)] based on DIN ISO 787/II, ASTM D 280, JIS K 5101/21
[4)] based on DIN 55921, ASTM D 1208, JIS K 5101/23
[5)] based on DIN ISO 787/IX, ASTM D 1208, JIS K 5101/24
[6)] based on DIN ISO 787/XVIII, JIS K 5101/20
[7)] based on substance dried at 105° C. for 2 hours
[8)] based on substance calcined at 1000° C. for 2 hours
[9)] special moisture-protective packaging
[10)] HCl content in constituent from loss on ignition

EXAMPLES

The hydrophilic fumed silica Aerosil® 200 and the hydrophilic fumed silica Aerosil® 300 are structurally modified using a ball mill. In this case, as indicated in Table 2, water is added and regrinding takes place.

The structurally modified silicas obtained have a higher loss on drying than the initial silica.

The physicochemical data of the structurally modified, hydrophilic silicas obtained are shown in Table 3.

TABLE 2

| Identification | Oxide/starting material | Structural modification | Parts H$_2$O/ 100 parts oxide | Regrinding* |
|---|---|---|---|---|
| Comparative Example 1 | AEROSIL® 200 | No | — | No |
| Comparative Example 2 | AEROSIL® 300 | No | — | No |
| Example 1 | AEROSIL® 200 | Yes | 1.0 | No |
| Example 2 | AEROSIL® 200 | Yes | 1.5 | No |
| Example 3 | AEROSIL® 200 | Yes | 2.0 | No |
| Example 4 | AEROSIL® 200 | Yes | 5.0 | No |
| Example 5 | AEROSIL® 200 | Yes | 1.0 | TM |
| Example 6 | AEROSIL® 200 | Yes | 1.0 | AJ |
| Example 7 | AEROSIL® 300 | Yes | 1.33 | No |
| Example 8 | AEROSIL® 300 | Yes | 3.0 | No |
| Example 9 | AEROSIL® 300 | Yes | 3.0 | No |
| Example 10 | AEROSIL® 300 | Yes | 2.0 | No |
| Example 11 | AEROSIL® 300 | Yes | 1.0 | No |
| Example 12 | AEROSIL® 300 | Yes | 1.0 | TM |
| Example 13 | AEROSIL® 300 | Yes | 1.0 | AJ |

*TM = toothed-disc mill

AJ = air-jet mill

Physicochemical Data of the Inventive Silicas and of the Comparative Silicas

TABLE 3

| Identification | BET specific surface area [m$^2$/g] | Tamped density [g/l] | Loss on drying [%] | Loss on ignition [%] | pH | DBP [%] | Grindometer value [μm] | Thickening |
|---|---|---|---|---|---|---|---|---|
| Comparative Example 1 | 202 | 54 | 0.8 | 0.7 | 4.5 | 290 | 28 | 2890 |
| Comparative Example 2 | 306 | 50 | 0.5 | 0.8 | 4.0 | 323 | 30 | 2955 |
| Example 1 | 206 | 172 | 1.3 | 0.8 | 4.4 | 219 | 175 | 290 |
| Example 2 | 203 | 184 | 1.8 | 0.8 | 4.5 | 201 | — | — |
| Example 3 | 204 | 179 | 2.1 | 0.8 | 4.5 | 198 | — | — |
| Example 4 | 202 | 189 | 4.6 | 1.0 | 4.6 | 186 | — | — |
| Example 5 | 204 | 142 | 1.3 | 0.8 | 4.7 | 204 | 150 | 350 |
| Example 6 | 203 | 31 | 0.9 | 1.0 | 4.5 | 199 | 30 | 760 |
| Example 7 | 311 | 133 | 1.2 | 1.1 | 4.4 | 232 | — | — |
| Example 8 | 309 | 185 | 2.8 | 1.2 | 5.7 | 197 | — | — |
| Example 9 | 308 | 181 | 3.0 | 1.2 | 4.2 | 215 | — | — |
| Example 10 | 308 | 144 | 2.0 | 1.0 | 4.3 | 227 | — | — |
| Example 11 | 306 | 127 | 1.3 | 1.0 | 4.4 | 230 | 175 | 330 |
| Example 12 | 306 | 117 | 1.1 | 1.1 | 4.4 | 230 | 150 | 310 |
| Example 13 | 307 | 27 | 1.0 | 1.0 | 4.3 | 206 | 50 | 735 |

Using various physicochemical data, Table 3 shows the effects of structural modification and of regrinding on the hydrophilic fumed silicas AEROSIL® 200 and AEROSIL® 300.

AEROSIL® 200 in the untreated state possesses a surface area of 202 m$^2$/g. This is not influenced or changed by the structural modification and regrinding (see Comparative Example 1 and also Examples 1 to 6).

The tamped density is increased as a result of the structural modification. The subsequent regrinding, however, lowers the tamped density again (see Examples 5 and 6).

The DBP number is lowered by the structural modification. It remains, however, unaffected by the regrinding.

The grindometer value is raised by the structural modification and returned to the original value by the regrinding, if the air-jet mill is used for regrinding.

The thickening effect of the hydrophilic fumed silica is lowered significantly by the structural modification, but increases somewhat as a result of the regrinding.

Grindometer Value

Principles:

The degree of dispersion determines the performance properties of the liquid thickened with Aerosil. The measurement of the grindometer value serves for assessing the degree of dispersion. By the grindometer value is meant the boundary layer thickness below which the bits or aggregates present become visible on the surface of the sample which has been coated out.

The sample is coated out in a groove with a scraper, the depth of the groove at one end being twice the size of the diameter of the largest Aerosil particles, and decreasing steadily down to 0 at the other end. On a scale indicating the depth of the groove, the depth value is read off, in micrometers, the value in question being that below which a relatively large number of Aerosil particles become visible as a result of bits or scratches on the surface of the binder system. The value read off is the grindometer value of the system present.

Apparatus and Reagents:
Hegmann grindometer with a depth range of 100-0 micrometer.
Polyester resin dispersion with 2% Aerosil, prepared according to Testing Instructions 0380.

The testing instructions run as follows:
Apparatus and Reagents:
Dispermat AE02-C1, VMA-Getzmann (dispersing disc, diameter 5 cm)
plastic beaker, 350 ml, external diameter 8.4 cm
plastic lid to fit
Monostyrene solution (100 g monostyrene+0.4 g paraffin)
Palatal® P6-01, DSM Composite Resins
Centrifuge, Jouan GmbH
Thermal-conditioning cabinet
Procedure:

142.5 g of Palatal® are weighed out into a plastic beaker and 7.5 g of Aerosil are weighed in; subsequently the Aerosil is stirred carefully into the Palatal, using the Dispermat at about 1000 $min^{-1}$ (any residues of Aerosil adhering to the beaker walls are brushed into the beaker with the Dispermat switched off) and then dispersed for 5 minutes at 3000 $min^{-1}$ (the distance of the dispersing disc from the bottom of the beaker is about 1 mm); the beaker is covered during this procedure with a lid including a drill hole.

60 g of the dispersion and 27 g of monostyrene solution are introduced into a further plastic beaker, with 63 g of Palatal® P6, and dispersion is carried out using the Dispermat at 1500 $min^{-1}$ for 3 minutes (beaker covered).

This results in a concentration of 2% Aerosil in the final mixture, which contains 18% monostyrene.

In order to remove air bubbles, the plastic beaker, sealed, is centrifuged in a laboratory centrifuge at 2500 $min^{-1}$ for 2.5 minutes. The dispersion is left standing in the covered beaker in the thermal-conditioning cabinet at 22° C. for 1 hour and 50 minutes.

A. Preparation of a Mixture of Unsaturated Polyester Resins with Silica Filler

Using the operating instructions described here, mixtures of hydrophilic AEROSIL® grades and unsaturated polyester resins are prepared, in order to characterize the granularity and the thickening capacity of the silicas.

| Formulation | | |
|---|---|---|
| 98% | Palatal A 410 | (from BÜFA) |
| 2% | silica | |

205.8 g of Palatal A 410 and 4.2 g of silica are weighed out into a PE beaker and the dissolver disc is fully immersed. Then the silica is homogenized (incorporated) at a speed n1 of 1000 $min^{-1}$ with the lid closed. As soon as the silica is fully incorporated, the speed is increased to n2, 3000 $min^{-1}$, and dispersion is carried out for 5 minutes. Subsequently the mixture is deaerated in a vacuum cabinet and stored in a water bath at 25° C. for at least 90 minutes.

B. Measurement of the Viscosity of Resins with Silica Filler

Resins (e.g. polyester resin, UP resin, vinyl ester resin) generally contain fillers for the purpose of improving the performance properties. Depending on the field of use, the nature and concentration of the filler used influence the rheological behaviour of the resin. A Brookfield DV III rheometer is used. Using a spatula, the mixture is homogenized in its storage vessel for 1 minute. In the course of this homogenization no bubbles ought to form. Subsequently the mixture is introduced into a 180 ml beaker until the beaker is almost full. Without delay, the measuring head of the rheometer is immersed fully into the mixture, and measurement takes place as follows:

| | | |
|---|---|---|
| 5 rpm | value read off after | 60 s |
| 50 rpm | value read off after | 30 s |

The values read off are the viscosities [Pa*s] at the respective rpm.

C. Determination of the Grindometer Value to DIN 53 203

Test Instrument
A Hegmann grindometer block is used.

Measuring Procedure
The grindometer block is placed on a flat, slip-proof surface and is wiped clean immediately prior to testing. A bubble-free sample is then introduced at the deepest point of the groove in such a way that it flows off somewhat over the edge of the groove. The scraper is then held in both hands and placed, perpendicularly to the grindometer block and at right angles to its longitudinal edge, with gentle pressure, onto the low end of the groove. The sample is then coated out in the groove by means of slow, uniform drawing of the scraper over the block. The granularity is read off not later than 3 seconds after the sample has been scraped.

The surface of the sample is viewed obliquely from above (at an angle of 20-30° to the surface) transversely to the groove. The block is held to the light in such a way that the surface structure of the sample is readily apparent.

The value found as granularity on the scale is the figure in micrometers below which a relatively large number of silica grains become visible as bits or scratches on the surface. Individual bits or scratches occurring randomly are not taken into account in this context.

The granularity is assessed at least twice, in each case on a dispersion which has been newly coated out.

Evaluation:
From the measured values the arithmetic mean is formed.

The relationship between the grindometer value in micrometers and the FSPT units and Hegmann units, which are based on the inch system, is as follows:

$$B=8-0.079A$$

$$C=10-0.098A=1.25B$$

In this relationship:
A=grindometer value in micrometers
B=grindometer value in Hegmann units
C=grindometer value in FSPT units

TABLE 4

Formula of 2K PU HS clearcoat

| Grinding medium | Blank sample | Silica powder |
|---|---|---|
| Macrynal SM 565, 70% | 61.0 | 61.0 |
| Butyl acetate | 9.3 | 9.3 |

TABLE 4-continued

| Formula of 2K PU HS clearcoat | | |
|---|---|---|
| Grinding medium | Blank sample | Silica powder |
| Methoxypropyl acetate | 1.7 | 1.7 |
| Solvesso 100 | 3.0 | 3.0 |
| Xylene | 2.7 | 2.7 |
| Silica powder | — | 5.0 |
| Curing agent | | |
| Desmodur N 3390, 90% | 22.3 | 22.3 |
| ☐ | 100.0 | 105.0 |

Preparation and Testing of the Coating Materials:

| | |
|---|---|
| Predispersion | Disperse 2.5 times the amount of grinding medium for 5 minutes using a dissolver at 2500 rpm |
| Dispersion | Bead mill SL 5, 2500 rpm, pump 50%, time: 45 min<br>0.5 mm Ce-stabilized $ZrO_2$ beads grindometer value after 15 min <10 μm |
| Addition of the curing agent | The curing agent Desmodur N 3390 is added with stirring (1000 rpm), followed by homogenization for about 1 minute |
| Viscosity measurement | Compilation of flow curves of the grinding medium on the next day and flow curves and yield curves of the coating material 15 minutes following addition of the curing agent:<br>flow curve: $\dot{\gamma} = 50\ s-1\ (30\ s)$<br>rest (600 s)<br>$\dot{\gamma} = 0.1\ s-1$ to $500\ s-1\ (150\ s)$ |
| Application | Spray application at 21 s DIN 4 mm on black-painted panels (DT36) using an automatic sprayer<br>Setting: 1 cross pass at setting 3.5<br>Dry film thickness: about 40 μm<br>Spraying diluent:<br>Butyl acetate 98% 60<br>Xylene 25<br>Solvesso 15 |
| Drying conditions | About 24 h at RT, then 2 h at 70° C. |
| 20° reflectometer value Haze | The gloss and haze are assessed on coating films applied to black panels, using a reflectometer from Byk Gardner |
| Black number Mμ (assessment of transparency) | The determination is made on coating films which have been applied to panels sprayed black, using a D19C densitometer from Gretag Macbeth. The black number Mμ is the value measured multiplied by one hundred. |
| Wave scan (levelling) | The levelling is assessed using a Wavescan plus instrument from Byk-Gardner |
| Scratch resistance, wet | Abrasion testing instrument from Braive Instruments, using abrasive brushes with pig bristles, 40 double rubs with $SiO_2$ slurry.<br>The slurry was prepared anew for each abrasion procedure (4 panels):<br>strong: 400 g deionized water<br>4 g Marlon A 350, 0.25% strength in water<br>20 g of Sikron SF 500 (quartz)<br>Homogenized with a paddle stirrer at 1000 rpm for 1 minute.<br>The scratch tests were carried out a week after applying the coatings.<br>Gloss and haze measured 10 minutes after scratching, against the scratch tracks.<br>The residual gloss is reported in %. |
| Scratch resistance, dry | Crockmeter model 670 (Schröder), five double rubs using polishing paper grade 9MIC blue (281Q Wetordry Production - 3M) |

Results

TABLE 5

| Viscosity - flow time, optical properties | | | | | |
|---|---|---|---|---|---|
| | Blank sample | Dispersion from WO 07/128636 | Dispersion from WO 04/020532 | Silica from Comparative Example 1 | Silica from Example 1 |
| Flow time DIN 4 mm (s) | 44 | 63 | 64 | 89 | 60 |
| Wave scan | | | | | |
| L | 3 | 9 | 15 | 7 | 5 |
| S | 0.3 | 3 | 13 | 2 | 3 |
| Flow, visual* | 1 | 2 | 3-4 | 2 | 2 |

*German school grade system

TABLE 6

| Scratch tests | | | | | | |
|---|---|---|---|---|---|---|
| | Black number Mμ | Gloss before scratch | Gloss after scratch | Residual gloss [%] | Haze before scratch | Haze after scratch | Δ Haze |
| 5% Sikron SF500 | | | | | | | |
| Blank sample | 289 | 88.0 | 32.3 | 36.7 | 8 | 102 | 94 |
| Dispersion from WO 07/128636 | 270 | 83.8 | 63.9 | 76.3 | 9 | 33 | 24 |
| Dispersion from WO 04/020532 | 278 | 84.7 | 54.1 | 63.8 | 9 | 52 | 43 |
| Silica from Comparative Example 1 | 283 | 87.3 | 51.6 | 59.1 | 9 | 62 | 53 |
| Silica from Example 1 | 281 | 86.5 | 54.0 | 62.4 | 8 | 60 | 51 |
| Crockmeter | | | | | | | |
| Blank sample | | 88.0 | 39.4 | 44.8 | 8 | 120 | 112 |
| Dispersion from WO 07/128636 | | 83.8 | 69.6 | 83.1 | 9 | 58 | 49 |
| Dispersion from WO 04/020532 | | 84.8 | 70.7 | 83.4 | 9 | 59 | 50 |
| Silica from Comparative Example 1 | | 87.3 | 61.3 | 70.2 | 9 | 83 | 74 |
| Silica from Example 1 | | 86.5 | 65.4 | 78.8 | 9 | 64 | 55 |

Experience suggests that structurally modified silicas are more difficult to disperse. In the examples above, therefore, dispersion was carried out using a bead mill. The examples below show the effect of grinding on the structurally modified hydrophilic silicas. To assess the dispersibility, dispersion was carried out for 60 minutes using a Skandex disperser, in 500 ml glass bottles with addition of 400 g of glass beads (3 mm in diameter).

TABLE 7

| | Grindometer value (μm) 30' | Black number My | 20° reflectometer value | Haze |
|---|---|---|---|---|
| Example 1 | 16 | 275 | 85.7 | 21 |
| Example 5 | 16 | 277 | 85.7 | 22 |
| Example 6 | 10 | 276 | 86.4 | 16 |
| Example 11 | 17 | 279 | 85.3 | 28 |
| Example 12 | 17 | 279 | 85.3 | 29 |
| Example 13 | 11 | 278 | 85.9 | 22 |

The coatings properties are not notably affected in the case of grinding in accordance with version /1; it is therefore surprising that the process /2 significantly improves the grindometer value and the haze in the case of the AEROSIL 200 and the AEROSIL 300 variant.

The invention claimed is:

1. A coating system comprising 0.5% by weight to 30% by weight of a hydrophilic, structurally modified, fumed, non-silanized silica.

2. The coating system according to claim 1, wherein the silica is reground.

3. The coating system according to claim 1, wherein the silica has a tamped density of 100 to 250 g/l.

4. The coating system according to claim 1, wherein the silica has a DBP number of 160 to 240 g/100 g or 180 to 250 g/100 g.

5. The coating system according to claim 1, wherein the silica has a grindometer value of 60 μm or less.

6. The coating system according to claim 1, wherein the silica has a BET surface area of 50±30 to 380±30 m$^2$/g.

7. The coating system according to claim 1, wherein the silica has a black number of 275 to 279 My.

8. The coating system according to claim 1, wherein the structural modification of the silica is carried out by a ball mill.

9. The coating system according to claim 8, wherein prior to and/or during the structural modification, water is added to the silica.

10. The coating system according to claim 9, wherein water is added to the silica in an amount of 0.5% to 5% by weight.

* * * * *